US009726007B2

(12) United States Patent
Hejleh et al.

(10) Patent No.: US 9,726,007 B2
(45) Date of Patent: Aug. 8, 2017

(54) DOWNHOLE SURVEYING

(71) Applicant: GLOBALTECH CORPORATION PTY LTD, Canning Vale (AU)

(72) Inventors: Khaled Hejleh, Peppermint Grove (AU); Gordon Stewart, Claremont (AU); Brett James Wilkinson, Wembley Downs (AU); Michael Alan Klass, Winthrop (AU); Johan Anwar, Kalamunda (AU)

(73) Assignee: Globaltech Corporation Pty Ltd, Canning Vale (AU)

( * ) Notice: Subject to any disclaimer, the term of this patent is extended or adjusted under 35 U.S.C. 154(b) by 0 days.

(21) Appl. No.: 14/384,285

(22) PCT Filed: Mar. 12, 2013

(86) PCT No.: PCT/AU2013/000228
§ 371 (c)(1),
(2) Date: Sep. 10, 2014

(87) PCT Pub. No.: WO2013/134814
PCT Pub. Date: Sep. 19, 2013

(65) Prior Publication Data
US 2015/0029035 A1   Jan. 29, 2015

(30) Foreign Application Priority Data

Mar. 12, 2012  (AU) ................ 2012900978

(51) Int. Cl.
*G01V 3/00* (2006.01)
*E21B 47/12* (2012.01)
(Continued)

(52) U.S. Cl.
CPC ............ *E21B 47/12* (2013.01); *E21B 17/003* (2013.01); *E21B 47/01* (2013.01); *E21B 47/0905* (2013.01); *G01V 3/26* (2013.01)

(58) Field of Classification Search
CPC .......... E21B 44/00; E21B 47/01; E21B 10/00; E21B 47/12; E21B 7/04; E21B 21/08; E21B 47/00
(Continued)

(56) References Cited

U.S. PATENT DOCUMENTS 4,323,848 A    4/1982 Kuckes
4,529,939 A    7/1985 Kuckes
(Continued)

*Primary Examiner* — Don N Vo
(74) *Attorney, Agent, or Firm* — Charles H Jew

(57) ABSTRACT

A drillstring first tube portion (10) for connection to further tube portions (24,26) of a drillstring via respective connection means has a side wall (16) including non ferromagnetic material, and at least one downhole survey device (12) mounted directly or indirectly on or within the side wall. The survey device has at least one survey instrument to obtain survey data, a power source (22) and wireless communication means (18) to wirelessly receive and/or transmit survey data within or on the side wall. A method of conducting a downhole survey of drilling using such an apparatus is also disclosed, as well as a method of obtaining data gathered downhole. The survey device and a core orientation device (32) may communicate wirelessly, such as when passing each other.

23 Claims, 2 Drawing Sheets

(51) Int. Cl.
  *E21B 47/01* (2012.01)
  *E21B 47/09* (2012.01)
  *E21B 17/00* (2006.01)
  *G01V 3/26* (2006.01)

(58) Field of Classification Search
  USPC .................................................... 340/854.4
  See application file for complete search history.

(56) References Cited

U.S. PATENT DOCUMENTS

| | | | |
|---|---|---|---|
| 4,630,243 A | | 12/1986 | MacLeod |
| 4,649,349 A | | 3/1987 | Chiron et al. |
| 5,163,521 A | * | 11/1992 | Pustanyk ............... E21B 7/04 |
| | | | 175/107 |
| 5,343,152 A | | 8/1994 | Kuckes |
| 5,757,186 A | * | 5/1998 | Taicher ............... G01N 24/081 |
| | | | 324/303 |
| 2005/0016770 A1 | * | 1/2005 | Mayes .................. E21B 47/00 |
| | | | 175/41 |
| 2011/0088895 A1 | * | 4/2011 | Pop ....................... E21B 7/04 |
| | | | 166/254.2 |

* cited by examiner

DOWNHOLE SURVEYING

FIELD OF THE INVENTION

The present invention relates to downhole surveying in drilling operations.

BACKGROUND TO THE INVENTION

In subsurface drill-rig applications where diamond drilling methods are used to extract core samples during exploratory or directional drilling, it is essential to determine the orientation and survey position of each core's position underground before being drilled out and extracted. The purpose of this is to be able to produce a three dimensional 'map' of underground mineral/rock content. This is applicable to Mining, Oil & Gas exploration, Directional Drilling and Civil Engineering industries.

Current technologies use Core-Orientation units attached to core inner tubes and back-end assemblies to determine the correct orientation of the drilled out core sample after a preferred drilling distance, such as every 1.0 meter, 1.5 meters, 3.0 meters or 6.0 meters of drilling. These core orientation units measure rotational direction of the core sample before extraction. On retrieval at the surface of the hole, the rotational direction can be determined by electronic means and the upper or lower side of the core material physically 'marked' for later identification by geologists.

In addition, at periodic depths, say, 30 meter drilling intervals, a 'Survey Instrument' is lowered down the drill hole to determine azimuth (angular measurement relative to a reference point or direction), dip (or inclination) and any other required survey parameters. These periodic depth survey readings are used to approximate the drill-path at different depths. Together with the rotational position of the extracted core (from the core orientation device), the subsurface material content map can be determined.

The survey instruments, if utilising magnetic measurement components to determine azimuth (e.g. magnetometers), will be at least 3 meters from any significant metal parts having magnetic influence that might otherwise affect measurements by the probe's instruments. For example, ferro-metallic drill bit or any section of steel inner or outer tubes which make up the 'drill-string'. This is to ensure that the survey measurement is not corrupted by being in proximity to metallic material which could cause erroneous azimuth data readings. To achieve this requirement, the survey probe is inserted through the circular centre open section of the drill bit while the outer drill tube (attached to the drill bit) is raised three or more meters above the survey instrument to allow it to capture accurate azimuth data. To be positioned three or more meters below the drill bit and tubes, the survey instrument needs to be further attached to a series of aluminium rods (non-magnetic influence material) to achieve the distance separation.

The entire process as described above is considerably time consuming having to re-insert survey instruments every 30 meters while pulling back the drill string, removing and extracting data from both the core orientation and survey instruments and the need to assemble/disassemble mechanical fixtures to initiate start of operation and to read data from the instruments after extraction from the drill hole. There is also a need for substantial capital investment or lease/hire arrangements for the extra equipment needed on site.

It has been found desirable to provide an improved method and apparatus for obtaining downhole data without the need to insert a survey probe to measure azimuth and inclination/dip of the drillhole path.

SUMMARY OF THE INVENTION

With the aforementioned in mind, the present invention provides a drillstring first tube portion for connection to further tube portions of a drillstring via respective connection means, the first tube portion having a side wall including a non ferromagnetic material, and at least one downhole survey device mounted directly or indirectly on or within the side wall, the survey device including at least one electronic instrument to obtain survey data, a power source and wireless communication means to wirelessly receive and/or transmit survey data.

The present invention advantageously enables obtaining drill-hole survey readings without the need to insert a survey probe to measure azimuth and inclination/dip of the drill hole path (hence reducing equipment handling and amount of equipment, reducing repetition of operations by not needing to periodically withdraw the drill bit a certain distance in order to advance a probe ahead of, and therefore distanced from, the drill bit, and saving time).

One or more embodiments of the present invention may negate the need to conduct a multi-shot survey since a single shot survey can be taken at regular short intervals utilising the present invention.

Preferably the first tube portion is an outer tube portion for the drillstring. Thus, the survey instrument may be part of the outer casing (outer tube) and can take measurements downhole and/or communicate with a core orientation device or other instruments.

A further aspect of the present invention provides a downhole survey system including a drillstring first tube portion for connection to further tube portions of a drillstring via connection means at respective first and second ends of the first tube portion.

The first tube portion may preferably have a side wall including non ferromagnetic material, and at least one downhole survey device mounted directly or indirectly on or within the side wall, the survey device including at least one electronic instrument to obtain survey data, a power source and wireless communication means to wirelessly receive and/or transmit survey data, the system further including non ferromagnetic second and third tube portions each configured to releasably connect to one of the first or second ends of the first tube portion and to releasably connect to a remainder of the drillstring.

Thus, the second and third tube portions act as non magnetic influencing distance pieces to maintain the survey device a required distance from magnetically influencing parts of the rest of the drillstring.

Preferably the second and third tube portions are formed entirely or primarily of stainless steel, aluminium or other non ferromagnetic metal. Non-metallic first, second and/or third tube portions are also envisaged, such as being formed of composite materials, such as carbon fibre, either alone or in combination with non ferromagnetic metals.

It is intended to preferably apply the present invention in a 'one-pass' operation during a core sample extraction process.

The ability to obtain drill-hole survey data every time a core sample is extracted will have the added advantage of being able to survey the drill-hole every 3 or 6 meters (instead of 30 meters) depending on the length of core sample being extracted. There would be no need to separately insert a survey instrument to the bottom of the drill-hole after every 30 meters of drilling, or its attachment of 3 meters of aluminium extension rods to achieve separation from the magnetically influenced drill bit and steel drill string.

Another aspect of the present invention provides a method of conducting a downhole survey of drilling, the method including: providing a drillstring having a drill bit at a distal end thereof; using a drill bit within the drillstring to drill a borehole; providing a non ferromagnetic first tube portion in the drillstring, the first tube portion including a survey device to obtain, in use, survey data relating to the borehole; obtaining the survey data.

The present invention may preferably include incorporating into the drillstring a first non ferromagnetic distance tube between the first tube portion and the drill bit and a second non ferromagnetic distance tube between the first tube portion and an upper end of the drillstring to thereby distance the survey device from magnetic effects of lower and upper portions of the drillstring.

There may be wireless communication between the survey device and a core orientation device, the core orientation device connected to an inner tube attached to the drill bit.

The survey device and the core orientation device may communicate wirelessly when the core orientation device passes the survey device when the core orientation device is travelling down into or being retrieved from the borehole.

Alternatively, the survey device and core orientation device may communicate one way or two ways with each other, when drilling has ceased or during drilling.

The core orientation device may store survey data communicated to it from the survey device, whereby survey data is retrieved for analysis when the core orientation device is retrieved to the surface. The survey device may store survey data for late retrieval to the surface for analysis.

Advantages are that there is more time available for drilling due to less time required for surveying and manipulating additional pieces of equipment and mechanical extensions during the survey process.

DESCRIPTION OF PREFERRED EMBODIMENT

One or more embodiments of the present invention will now be described with reference to the accompanying figures.

Figure 1:
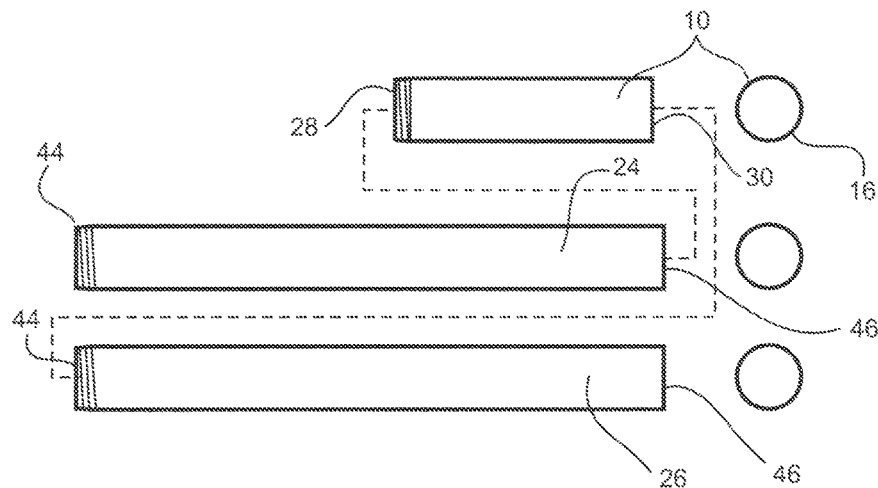
FIG. 1 shows an embodiment of the present invention in the form of a first tube portion incorporating a survey device with instrumentation within the side wall and arranged to be connected to non magnetic distance tubes.
Figure 2:
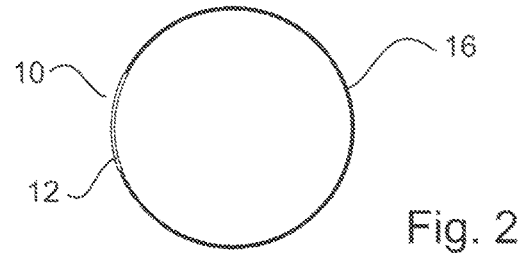
FIG. 2 shows an embodiment of a system of the present invention including a survey device connected between non ferromagnetic distance tubes.

As shown in FIG. 1, a non-ferromagnetic stainless-steel first tube portion 10 includes a survey device 12 within the side wall 16 (see cross section FIG. 2).

The components of the survey device may be embedded in the material of the side wall or set into a recess in the side wall and covered by a cover plate, such as a metal plate of the same non ferromagnetic material as the tube side wall or a composite (carbon) based material. Those components may be held in place within the side wall by a resin e.g. adhered or bonded in place.

The electronics can be coated by the bonding material, such as a resin, to provide waterproofing.

Alternatively, or in addition, a cover plate over the recess can have a seal which seals the cover plate over the recess to prevent ingress of water and dirt into the recess.

Another way of incorporating the electrical components of the survey device into the side wall of the first tube portion is to sandwich the components between layers of composite material. In this way, essentially the components become part of the structure of the tube.

FIG. 2 shows an example of this construction. This ensures strength is maintained in the tube and helps to avoid air pockets which may otherwise weaken the tube.

For example, a first layer of composite material may be laid down, such as winding, layering or spraying around a former or mandrel, placing the components onto this layer, and then applying a second layer over the components and over the first layer.

Preferably the components are mounted to a flexible material, such as mylar or fibreglass sheet before being sandwiched between layers of the composite.

In preferred embodiments, the electronic components are mounted spirally or helically around and within the extent of the tube side wall. This has been found to maintain strength and integrity in the tube structure over and above laying the components lengthwise or circumferentially within the tube side wall.

The PCBs (printed circuit boards) can have printed connecting tracks where circuits are mounted on the substrate (mylar, fiberglass sheet etc).

The components used are miniature and usually Surface-Mount-Technology/Surface-Mount-Devices (SMT/SMD) or Chip-On-Board (COB). Apart from using PCBs, miniature discrete wired components can be utilized which also gives flexibility and ease of integration into the composite fibre pipe.

Flexible PCB arrangements with component layout on the flexible PCB allow 'spiralling' COB with discrete wire bonding connections.

The flexible PCB can be shaped so as to give least 'gap' area in the pipe where the PCB occupies space. The flexible PCBs can be curved, helical, spiral or thin strips of connected PCBs so as to minimise the lack of woven fibre area where the PCB(s) is(are) inserted before the next layers of woven fibre are added to form the pipe structure.

The survey device includes electronics in the form of a printed circuit board (PCB) 14, a wireless communication device (e.g. RF) 18, various sensors 20 and rechargeable battery 22 within the side wall 16 of the first tube portion. The embedded circuits are that of a survey instrument to measure positional azimuth and inclination (dip) of the drillstring, and other survey related data as required.

The survey device 12 takes magnetic measurements as part of its collected data, which means that it has to be sufficiently distanced from any other metallic material that may cause anomalous readings, such as from the diamond headed drill bit 36, outer casing 40 below the survey device 12, or remaining outer drill-rods 42 (drill-string) above which are added on as the drill-bit 36 descends further underground.

Figure 3:
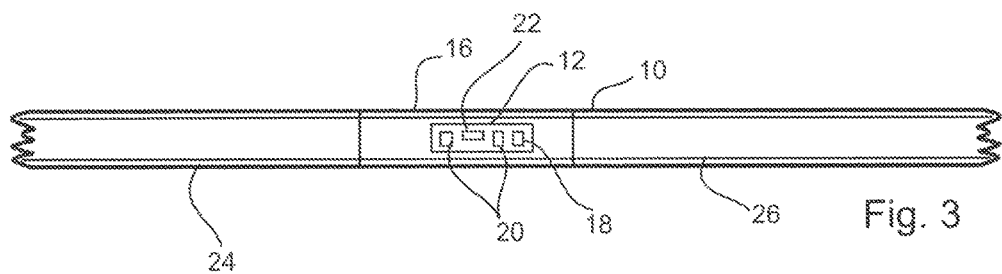
FIG. 3 a cross section through a first tube portion revealing embedded electronics of the survey device according to an embodiment of the present invention.

To achieve this magnetic influence separation, two non-magnetic distance tubes (rods) 24,26, preferably of 3 meter (or greater) length are attached at respective first 28 and second 30 ends of the survey device 12, as shown in FIG. 3.

These distance tubes 24,26 are then further attached to industry standard steel rods; such as by standard industry internal and external screw threads 44,46, for the Coring/Drill-Bit section at one end and the Drill-String at the other.

The distance tubes 24,26 are preferably of a non-magnetic composite material or some other non-ferrous metal/alloy such as stainless steel, or a combination thereof, such as a shell of stainless steel coated in carbon fibre or vice versa.

Figure 4:
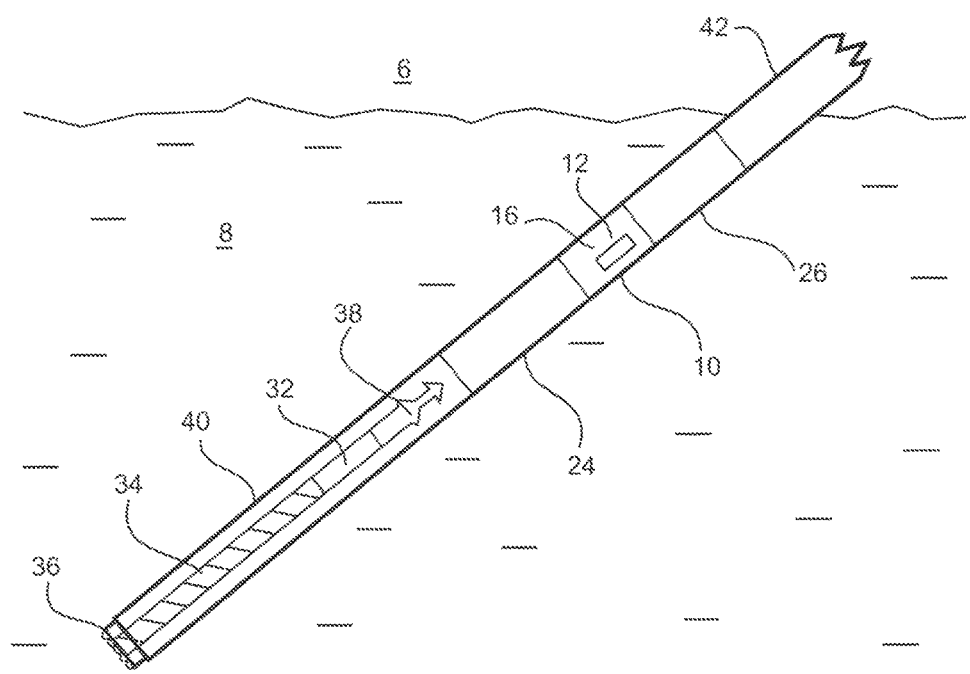
FIG. 4 shows a device and system according to embodiments of the present invention in situ as part of a drillstring in a drill hole.

Core Orientation Device:

As shown with reference to FIG. 4, a system according to one or more forms of the present invention may include a core orientation device 32.

The core orientation device may include means to detect orientation direction of a core sample 34 before the core sample is extracted.

The core orientation device can have additional circuits to communicate wirelessly (e.g. RF) with the survey device 12, and preferably have memory able to store survey results from the survey device to be later retrieved at the surface at the drill-rig site. This core orientation device is attached, in the usual industry standard way, to an inner coring tube, degreaser and back-end assembly 38.

When the coring assembly is being inserted into a drill-hole from the surface 6 into the ground 8 before further drilling and core extraction, the core orientation device 32 passes the survey device 12 providing an opportunity to transmit data wirelessly from the survey device 12 to the core orientation device 32.

Data may also be transferred during return travel of the core orientation device back up the drillstring after retrieving the core-sample on the way up to the surface.

Survey and Core Orientation Data Acquisition

Once the core sample is retrieved from the ground 8 to the surface 6, a single handheld controller device can orientate (indicating the underground orientation) of the core sample for marking as well as obtain survey data. This is a one-pass operation where survey data is retrievable after every core sample extraction (3 to 6 meters) instead of every 30 meters.

There is no need to additionally insert a survey instrument to obtain survey results and there is considerable time savings and consequently more drilling time at the drill-rig. Using software tools, a directional drilling system is possible with dynamic visual data available after every core sample extraction.

The survey device can include low profile SMD electronic componentry embedded into the side-wall 16 of a stainless steel (or other non-magnetic material) tubing. Also, the core orientation device 32 is able to interface with wireless and contactless Transmit and Receive (Tx/Rx) communication devices.

This core orientation device, when used as described in the methodology and system of the present invention above, will serve to communicate with, and store data from the embedded survey instrument 12. Electronics will be powered by long life non-rechargeable batteries, or rechargeable batteries which can function for several months before requiring a recharge.

The invention claimed is:

1. A downhole survey system including a drillstring first tube portion configured for connection to further tube portions of a drillstring via respective connections, which comprises a first hollow tube portion having a side wall portion of non-ferromagnetic material, and at least one downhole survey device mounted to a recess in the non-ferromagnetic material or bonded to the non-ferromagnetic material or embedded in the non-ferromagnetic material or set into the non-ferromagnetic material, the survey device including at least one survey instrument to obtain survey data, a power source and wireless communication device to wirelessly receive and/or transmit obtained survey data to a core orientation device or to another electronic instrument inserted into the drillstring first tube portion and arranged to pass the survey device during transit of the core orientation device or the other electronic instrument within the drillstring first tube portion and to retrieve and store the obtained survey data by wireless transmission of the survey data between the survey device and the core orientation device or the other electronic instrument during said transit subsequent retrieval of the core orientation device or the other electronic instrument to the surface with the stored survey data.

2. The downhole survey system according to claim 1, the first hollow tube portion being an elongated hollow tube, wherein the side wall extends from the survey device a distance to each of opposite first and second ends of the first hollow tube portion to isolate the survey device from significant magnetic effects of steel portions of the drillstring.

3. The downhole survey system according to claim 1, including non-ferromagnetic second and third hollow tube portions each configured to releasably connect to a respective one of two opposite ends of the first hollow tube portion and to releasably connect to a remainder of the drillstring.

4. The downhole survey system according to claim 3, wherein the second and third hollow tube portions act as non-magnetic distance tubes to maintain the survey device a required distance from magnetically influencing parts of the drillstring.

5. The downhole survey system according to claim 4, wherein the second and third hollow tube portions are formed entirely of or primarily of stainless steel, aluminium, other non-ferromagnetic metal, or of composite material, or a combination of one or more of the aforementioned non-ferromagnetic metals or composite materials.

6. The downhole survey system according to claim 1, wherein the survey device includes instrumentation to measure azimuth and inclination of a drill hole.

7. The downhole survey system according to claim 1, wherein the survey device or the at least one survey instrument are bonded to or embedded in the non-ferromagnetic material of the side wall portion by adhesive or resin.

8. The downhole survey system according to claim 1, wherein electronic components of the survey device are mounted spirally or helically around the side wall.

9. The downhole survey system according to claim 8, wherein the electronic components are mounted within the side wall.

10. The downhole survey system according to claim 1, wherein electronic components of the survey device are mounted to a flexible material before being sandwiched between layers of composite material providing the non-ferromagnetic material.

11. The downhole survey system according to claim 10, wherein the flexible material includes mylar or fiberglass sheet.

12. The downhole survey system according to claim 1, wherein the communication device of the survey device includes a receiver to receive data transmitted from the core orientation device or the other electronic instrument.

13. A method of conducting a downhole survey of drilling, the method including:
 a) providing a drillstring having a drill bit at a distal end thereof;
 b) using a drill bit within the drillstring to drill a borehole;

c) providing a non-ferromagnetic side wall portion of a first hollow tube portion in the drillstring, the first hollow tube portion including a survey device to obtain, in use, survey data relating to the borehole wherein the survey device is mounted to a recess in the non-ferromagnetic material or bonded to the non-ferromagnetic material or embedded in the non-ferromagnetic material or set into the non-ferromagnetic material, the survey device includes at least one survey instrument to obtain survey data, a power source and wireless communication device to wirelessly receive and/or transmit survey data to a core orientation device or to another electronic instrument;

d) obtaining the survey data with the at least one survey instrument; and e) while the core orientation device or other electronic instrument is in transit within the drillstring, transmitting the survey data to the core orientation device or to the other electronic instrument for subsequent retrieval of the survey data from the core orientation device or the other electronic instrument to the surface.

14. The method according to claim 13, including incorporating into the drill string a first non-ferromagnetic distance hollow tube between the first hollow tube portion and the drill bit and a second non ferromagnetic distance hollow tube between the first tube portion and an upper end of the drillstring to thereby distance the survey device from magnetic effects of lower and upper portions of the drillstring.

15. The method according to claim 13, including wirelessly communicating between the survey device and a core orientation device or another electronic instrument, the core orientation device or the other electronic instrument connected to an inner tube.

16. The method according to claim 15, whereby the survey device and the core orientation device communicate wirelessly when the core orientation device or other electronic instrument passes the survey device when the core orientation device or other electronic instrument is travelling down into or being retrieved from the borehole.

17. The method according to claim 15, whereby the core orientation device or other electronic instrument stores the survey data communicated to it from the survey device, whereby survey data is retrieved for analysis when the core orientation device is retrieved to a surface.

18. The method according to claim 13, including the core orientation device or the other electronic instrument having a transmitter and transmitting data to the survey device.

19. The method according to claim 13, including transmitting the survey data from the survey device to the core orientation device or the other electronic instrument as the core orientation device or the other electronic instrument travels within the drillstring and passes the survey device.

20. The method according to claim 19, wherein the survey data is transmitted to the core orientation device or the other electronic instrument when the core orientation device or the other electronic instrument is deployed downward into the drillstring.

21. The method according to claim 19, wherein the survey data is transmitted to the core orientation device or the other electronic instrument when the core orientation device or the other electronic instrument is retrieved upward from the drillstring.

22. A downhole survey system including a drillstring first tube portion, for connection to further tube portions of a drillstring via respective connections, which comprises a first hollow tube portion having a side wall portion of non-ferromagnetic material, and at least one downhole survey device mounted to a recess in the non-ferromagnetic material or bonded to the non-ferromagnetic material or embedded in the non-ferromagnetic material or set into the non-ferromagnetic material, the survey device including at least one survey instrument to obtain survey data and a wireless communication device to wirelessly transmit obtained survey data, and a core orientation device or another electronic instrument provided to travel within the drillstring and arranged to pass the survey device and to wirelessly receive the obtained survey data transmitted wirelessly from the survey device for retrieval of the survey data with the core orientation device or the other electronic instrument to the surface.

23. The downhole survey system according to claim 22, the core orientation device or the other electronic instrument including a transmitter to transmit data to the survey device.

* * * * *